(12) United States Patent
Chong

(10) Patent No.: US 8,991,845 B2
(45) Date of Patent: Mar. 31, 2015

(54) VEHICULAR SYSTEM HAVING USER-INTERFACE ASSEMBLY

(76) Inventor: Henry Chong, Toronto (CA)

( * ) Notice: Subject to any disclaimer, the term of this patent is extended or adjusted under 35 U.S.C. 154(b) by 304 days.

(21) Appl. No.: 13/472,049

(22) Filed: May 15, 2012

(65) Prior Publication Data

US 2012/0292881 A1 Nov. 22, 2012

Related U.S. Application Data

(60) Provisional application No. 61/518,917, filed on May 16, 2011.

(51) Int. Cl.
| | | |
|---|---|---|
| *B62M 6/40* | (2010.01) | |
| *B62K 3/10* | (2006.01) | |
| *B62M 1/36* | (2013.01) | |
| *B62K 3/00* | (2006.01) | |
| *B62K 3/02* | (2006.01) | |

(52) U.S. Cl.
CPC .... *B62K 3/00* (2013.01); *B62K 3/02* (2013.01)
USPC .......................... 280/260; 280/281.1; 280/259

(58) Field of Classification Search
CPC ............ B62M 5/00; B62M 3/00; B62M 6/00; B62K 3/00
USPC ................. 280/252, 265, 291, 87.1, 259, 260; 74/594.1, 594.7; 192/64; 482/57
See application file for complete search history.

(56) References Cited

U.S. PATENT DOCUMENTS

| | | | |
|---|---|---|---|
| 2,181,665 A * | 11/1939 | Messamore | 192/64 |
| 2,505,464 A | 4/1950 | Debuit | |
| 4,477,072 A * | 10/1984 | DeCloux | 482/4 |
| 5,261,294 A * | 11/1993 | Ticer et al. | 74/594.1 |
| 5,765,847 A * | 6/1998 | Toronto et al. | 280/237 |
| 5,860,329 A | 1/1999 | Day | |
| 6,321,863 B1 | 11/2001 | Vanjani | |
| 6,419,254 B1 * | 7/2002 | Langen | 280/260 |
| 6,783,139 B1 * | 8/2004 | Wang et al. | 280/237 |
| 2009/0239717 A1 * | 9/2009 | Kim | 482/57 |
| 2010/0167881 A1 | 7/2010 | Day | |
| 2010/0192722 A1 * | 8/2010 | Shiu et al. | 74/594.7 |

FOREIGN PATENT DOCUMENTS

| | | | | |
|---|---|---|---|---|
| GB | 19044885 A | * | 0/1904 | |
| GB | 19091219 A | * | 0/1909 | |
| GB | 190312545 A | * | 0/1903 | |
| GB | 190316188 A | * | 0/1903 | |
| GB | 2466825 A | * | 7/2010 | |

* cited by examiner

*Primary Examiner* — Joseph Rocca
*Assistant Examiner* — Daniel Yeagley

(57) ABSTRACT

Vehicular system, including front wheel having user-interface assembly configured to selectively permit user to operate between limb-operating mode and side-by-side limb cruising mode. In side-by-side limb cruising mode, first and second crank arms are free to float and position by themselves while front wheel is steered to cause vehicular system to turn in such a way that first pedal and second pedal are positioned slightly offset from each other. In side-by-side limb cruising mode, control of vehicular system is improved because rider position is more balanced and an unnatural sensation of steering involving hands and feet becomes neutralized while: user maintains hands coupled to steering assembly and also maintains feet coupled to first pedal and second pedal; steering assembly turns front wheel toward one side; first crank arm and second crank arm freely float and position themselves; and first pedal and second pedal are positioned slightly offset from each other.

13 Claims, 7 Drawing Sheets

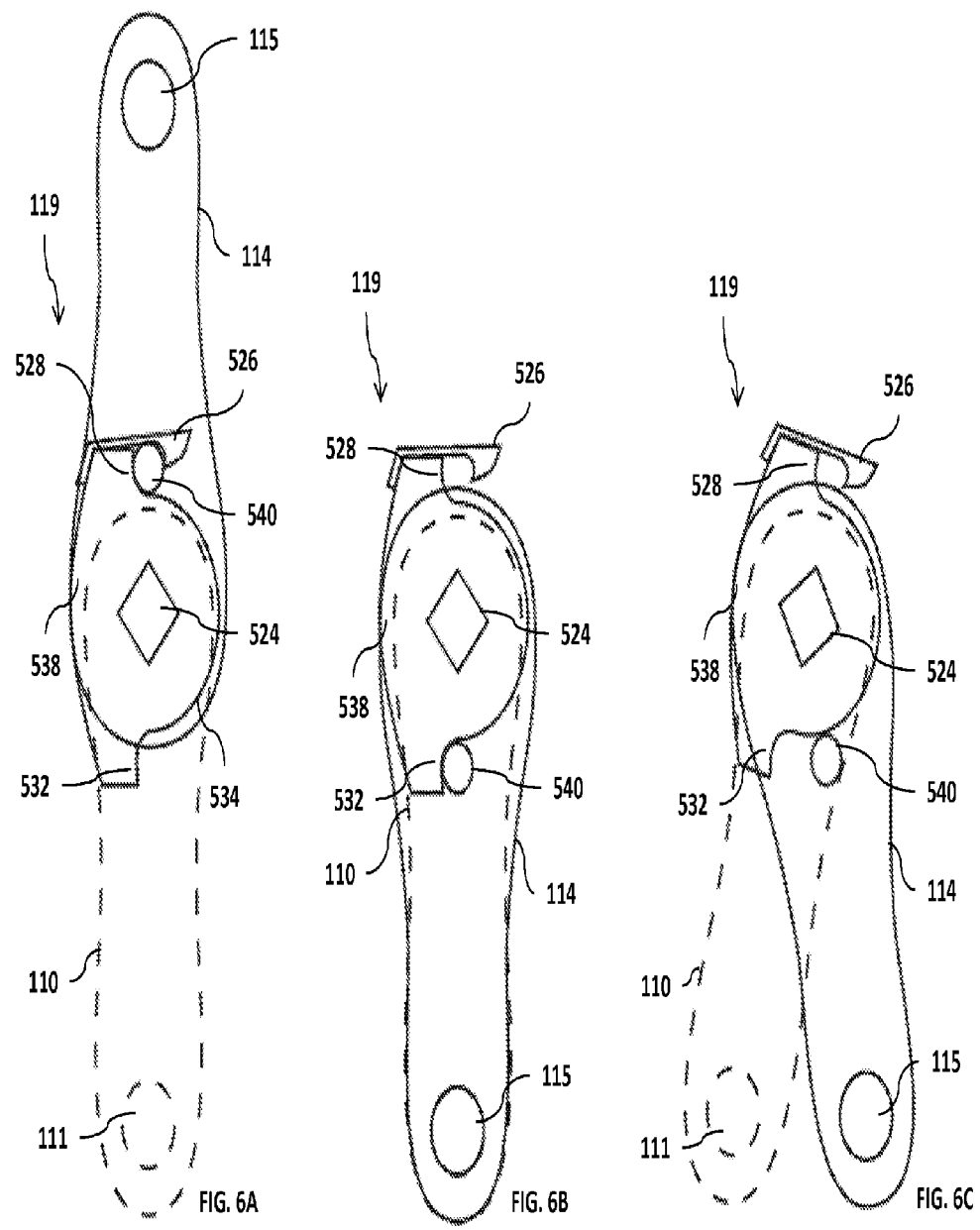

VEHICULAR SYSTEM HAVING USER-INTERFACE ASSEMBLY

CROSS-REFERENCE TO RELATED PATENT APPLICATION(S)

This patent application is a non-provisional patent application of prior U.S. Provisional Patent Application No. 61/518,917, filed May 16, 2011. This non-provisional application also claims the benefit and priority date of prior U.S. Provisional Application No. 61/518,917, filed May 16, 2011, the disclosure of which is incorporated by reference herein in their entirety.

TECHNICAL FIELD

Aspects generally relate to (and not limited to) a vehicular system, and more specifically related to a vehicular system having a user-interface assembly.

BACKGROUND

A vehicular system, or vehicle, is a mobile machine that is designed or used to transport people or cargo. Most often vehicles are manufactured, such as bicycles, cars, motorcycles, trains, ships, boats and aircraft. Vehicles that do not travel on land often are called craft, such as watercraft, sailcraft, aircraft, hovercraft and spacecraft. Land vehicles are classified broadly by what is used to apply steering and drive forces against the ground: wheeled, tracked, railed or skied. ISO 3833-1977 is the standard, also internationally used in legislation, for road vehicles types, terms and definitions.

An example of a vehicular system is a bicycle, often called a bike (and sometimes referred to as a pushbike, pedal bike, pedal cycle, or cycle). The bicycle is a human-powered, pedal-driven, single-track vehicle, having two wheels attached to a frame, one behind the other. A person who rides a bicycle is called a cyclist, or bicyclist (or user).

Bicycles were introduced in the 19th century and now number about one billion worldwide, twice as many as automobiles. The basic shape and configuration of a known upright bicycle has changed little since the first chain-driven model was developed around 1885. Several components that eventually played a key role in the development of the automobile were originally invented for the bicycle, including ball bearings, pneumatic tires, chain-driven sprockets, and spoke-tensioned wheels. The 1968, the Vienna Convention on Road Traffic of the United Nations considers a bicycle to be a vehicle, and a person controlling a bicycle (whether actually riding or not) is considered an operator.

Another example of a vehicular system is an electric bicycle, also known as an e-bike. The electric bicycle is a type of bicycle with an electric motor used to power the vehicle. Electric bicycles use rechargeable batteries and can travel up to 15 to 20 miles per hour (24 to 32 km/h). In many parts of the world, electric bicycles are classified as bicycles rather than motor vehicles.

Another example of a vehicular system is a motorized bicycle (motorbike, cyclemotor). The motorized bicycle is a type of bicycle with an attached motor and transmission used either to power the vehicle unassisted, or to assist with pedaling. Since it always retains both pedals and a discrete connected drive for rider-powered propulsion, the motorized bicycle is in technical terms a true bicycle, albeit a power-assisted one.

Another example of a vehicular system is a tricycle (often abbreviated to trike). The tricycle is a type of three-wheeled vehicle. The tricycle may be motorized or unmotorized (manually driven). Human-powered trikes are usually powered by pedals, although some models have hand cranks.

Another example of a vehicular system is a unicycle. The unicycle is a human-powered, single-track vehicle with one wheel. Unicycles resemble bicycles, but are less complex.

Another example of a vehicular system is a tandem bicycle or twin bicycle. The tandem bicycle is a form of bicycle (occasionally, a tricycle) designed to be ridden by more than one person. The term tandem refers to the seating arrangement (fore to aft, not side-by-side), not the number of riders. A bike with two riders side-by-side is called a sociable bicycle.

U.S. Pat. No. 2,505,464 (DEBUIT, issued on Apr. 25, 1950) discloses a bicycle having a human-powered front wheel configured for freewheel operation in FIG. 1 and in column 2, lines 30-32.

U.S. Pat. No. 5,860,329 (DAY, issued on Jan. 19, 1999) discloses a bicycle having pedals with active position and resting position in FIG. 7.

United States Patent Application Number 2010/0167881 (DAY, filed on Dec. 31, 2009) discloses a bicycle having pedals with active position and resting position in FIG. 11.

U.S. Pat. No. 6,321,863 (VANJANI, issued on Nov. 27, 2001) discloses a bicycle having an electric powered rear wheel using a hub motor used in combination with human power in FIG. 1 and in column 2, lines 41-44.

SUMMARY

The inventor has researched a problem associated with known vehicles, such as bicycles. After much study, the inventor believes he has arrived at an understanding of the problem and its solution, which are stated below.

For the penny farthing type bicycle, in which a front wheel assembly is sized larger in diameter relative to the diameter of a rear wheel assembly, it may appear to the user that there is an interaction between feet and hands that may feel unnatural.

In order to resolve, at least in part, the above-noted challenges and/or issues, according to a first aspect, there is provided a vehicular system for a user. The vehicular system comprising: a frame-interface assembly, and a user-interface assembly. The user-interface assembly is coupled to the frame-interface assembly. The user-interface assembly is configured to selectively permit the user to operate the vehicular system between a limb-operating mode and a side-by-side limb cruising mode.

Remaining aspects are described in the claims.

Other features of the non-limiting embodiments (examples) may now become apparent to those skilled in the art upon review of the following detailed description of the non-limiting embodiments with the accompanying drawings.

BRIEF DESCRIPTION OF THE DRAWINGS

The non-limiting embodiments may be more fully appreciated by reference to the following detailed description of the non-limiting embodiments when taken in conjunction with the accompanying drawings, in which:

FIGS. 6A, 6B, 6C depict examples of partial side views of the user-interface assembly of FIGS. 3A and 3B.

The drawings are not necessarily to scale and may be illustrated by phantom lines, diagrammatic representations and fragmentary views. In certain instances, details not necessary for an understanding of the embodiments (and/or details that render other details difficult to perceive) may have been omitted.

DETAILED DESCRIPTION OF THE NON-LIMITING EMBODIMENT(S)

The following detailed description is merely exemplary in nature and is not intended to limit the described embodiments or the application and uses of the described embodiments. As used herein, the word "exemplary" or "illustrative" or "example" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to relative orientation. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
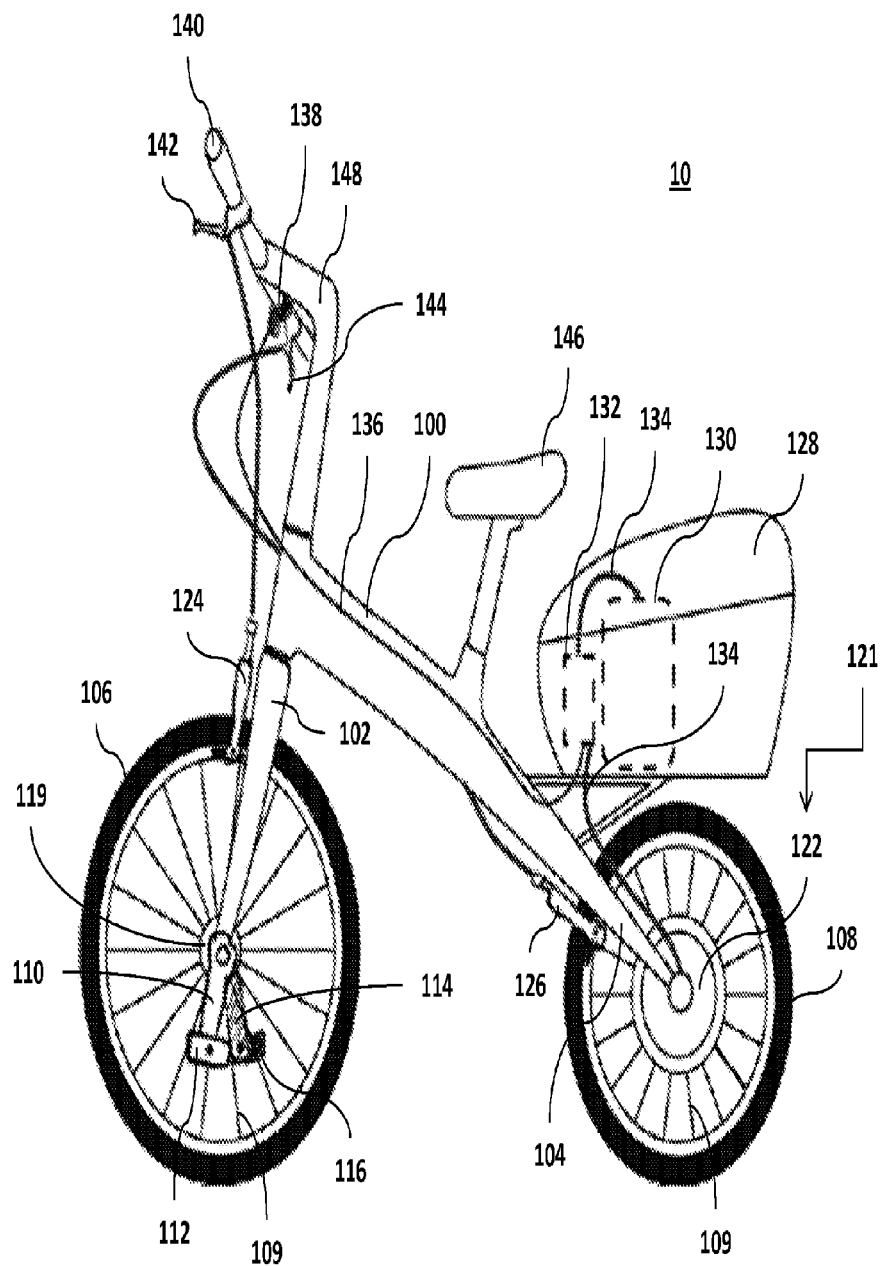
FIG. 1 depicts an example of a side elevation view of a vehicular system.

FIG. 1 depicts the example of the side elevation view of the vehicular system 10. The vehicular system 10 may include components that are known to persons skilled in the art, and these known components may not be described here; these known components are described, at least in part, in known technical reference books. As depicted in FIG. 1, the vehicular system 10 includes (for example) a frame assembly 100. The frame assembly 100 may be made from any type of material composition or combination of materials. The frame assembly 100 may be a single strut type frame, or a diamond shaped type frame, etc. A first fork assembly 102 extends forwardly and downwardly from the frame assembly 100. The first fork assembly 102 is depicted, by way of example, as a front fork. It is understood that a pair of the first fork assemblies 102 extend from the frame assembly 100. Similarly, a second fork assembly 104 extends downwardly and rearward from the frame assembly 100. The second fork assembly 104 is depicted as a rear fork. It is understood that a pair of the second fork assemblies 104 extend from the frame assembly 100. The first fork assembly 102 is set apart from the second fork assembly 104. A first wheel assembly 106 is rotatably mounted to the pair of first fork assemblies 102. The first wheel assembly 106 is depicted, by way of example, as the front wheel. It will be understood that the size of the first wheel assembly 106 may be determined from on an ergonomic decision based on the size of the frame assembly 100 and other components of the vehicular system 10. The size of the first wheel assembly 106 may be selected such that the first wheel assembly 106 does not interfere with the user during operation such as turning movements, etc. A second wheel assembly 108 is rotatably mounted to the pair of second fork assemblies 104. The second wheel assembly 108 is depicted as the rear wheel. The first wheel assembly 106 includes spoke members 109 that extend from the central zone of the first wheel assembly 106 toward the rim assembly, and the spoke members 109 are configured to support the rim assembly (known) in a circular arrangement. The rim assembly is configured to support and maintain the position of a tire assembly (known).

Figure 5:
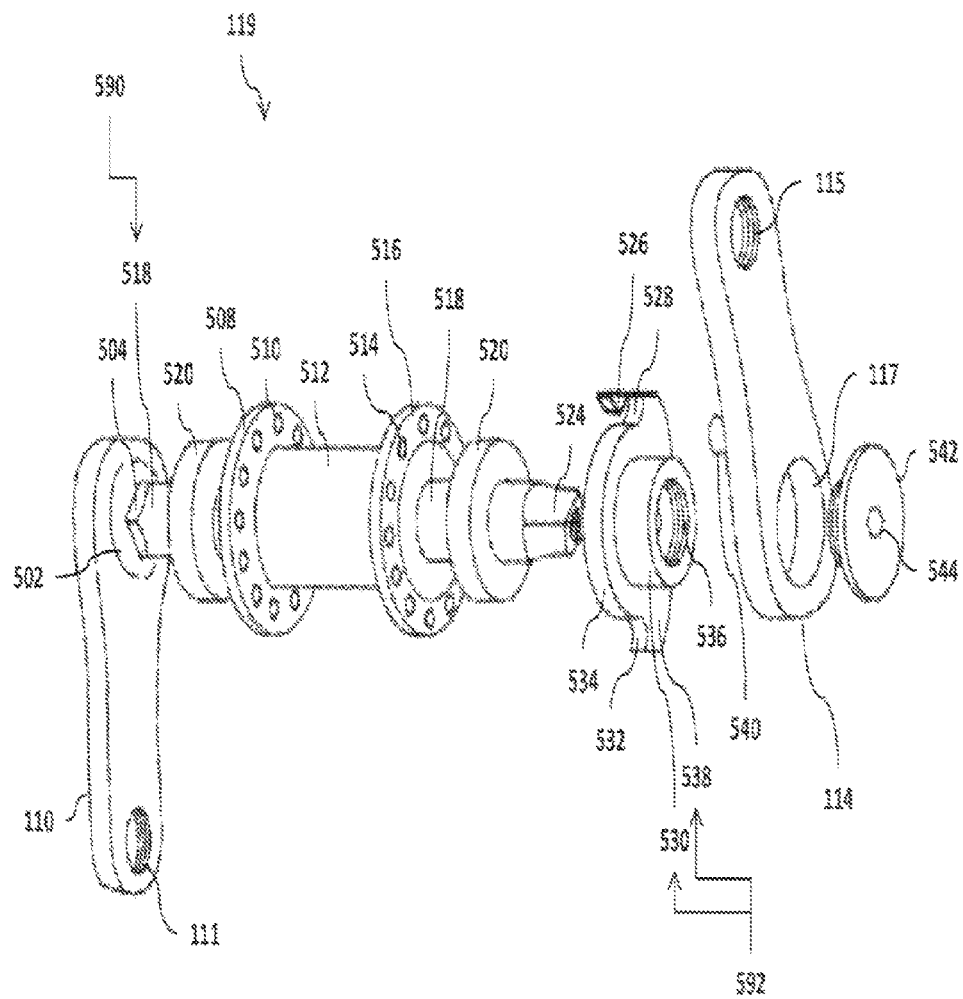
FIG. 5 depicts an example of an exploded view of the user-interface assembly of FIGS. 3A and 3B.

As depicted in FIG. 1, a user-interface assembly 119 is operatively mounted to the end portion of the first fork assembly 102. FIG. 5 depicts an example of a specific implementation of the user-interface assembly 119. During the limb-operating mode, the user-interface assembly 119 is configured to transfer, at least in part, energy generated by movement of user limbs of the user to the first wheel assembly 106, and the first wheel assembly 106 rotates in response to receiving the energy. The limb-operating mode (or position) is depicted in FIG. 2B. During the side-by-side limb cruising mode, the user-interface assembly 119 is configured to maintain, at least in part, side-by-side positioning of the user limbs of the user for a case where the first wheel assembly 106 rotates without receiving the energy generated by movement of the user limbs of the user. The side-by-side limb cruising mode (or position) is depicted in FIG. 2C.

A first crank arm 110 is mounted to one side of the user-interface assembly 119. A first pedal 112 is attached to an end portion of the first crank arm 110. A second crank arm 114 is mounted to the other side of the user-interface assembly 119. A second pedal 116 is attached to an end portion of the second crank arm 114.

An externally-powered assembly 121 is configured to provide external power to the vehicular system 10. According to what is depicted in FIG. 1, by way of example, the externally-powered assembly 121 includes an electric hub motor 122. The electric hub motor 122 is operatively coupled to the end portion of the second fork assembly 104. By way of example, the electric hub motor 122 is configured to be controllable by electric current received from a battery assembly 130 via a controller assembly 132. The second wheel assembly 108 is configured to receive torque (rotational force) from the electric hub motor 122. Specifically, the electric hub motor 122 transfers, in use, torque to the second wheel assembly 108. According to an option (and not limited to the option), the electric hub motor 122 includes a DC (direct current) electric brushless motor, and the controller assembly 132 is configured to transmit to the electric hub motor 122 phased pulses of electric current that are configured to urge the electric hub motor 122 to spin or rotate, thus rotating the second wheel assembly 108. A throttle-control switch 138 is configured to send a command signal to the controller assembly 132. The throttle-control switch 138 is attached to the handle bar 140. The command signal is configured to instruct the controller assembly 132 to permit an amount of electric current from the battery assembly 130 to the electric motor via the supply wires, thus controlling or adjusting the speed of the electric motors as may be required by the user 200.

A storage assembly 128 is operatively mounted to the frame assembly 100. The storage assembly 128 is configured to receive and support the battery assembly 130 and the controller assembly 132. A power wire 134 connects the battery assembly 130 the controller assembly 132. The power wire 134 also connects the controller assembly 132 to the electric hub motor 122. The battery assembly 130 provides electric energy to the electric hub motor 122 in response to the operation (command) of the controller assembly 132. A control wire 136 connects the controller assembly 132 to a throttle-control switch 138. The throttle-control switch 138 is attached to a handle bar 140. A user may manually control the throttle-control switch 138 to send a command signal to the controller assembly 132 to either turn on or off the supply of electric current from the battery assembly 130 to the electric hub motor 122. Alternatively, the throttle-control switch 138 may be configured to throttle or adjust the amount of electric current that the battery assembly 130 delivers to the electric hub motor 122 via the controller assembly 132. The storage assembly 128 may be optional. The storage assembly 128 may be configured to be compartmentalized in order that dedicated compartments may receive the controller assembly 132, the battery assembly 130 and/or user items such as books, clothing, food, water bottles, etc. The battery assembly 130 may include lithium-based materials or technology known to persons of skill in the art, in order to achieve: (i) a reduction in weight that allows the vehicular system 10 to be of a lighter weight thus reducing the burden on the battery assembly 130 by moving less weight, and/or (i) a reduction in size thus allowing the vehicular system 10 to be less bulky and cumbersome and easier to handle and store away.

A front brake caliper 124 is mounted to the first fork assembly 102. A front brake caliper 124 is configured to apply a braking force to the first wheel assembly 106. A rear brake caliper 126 is mounted to the second fork assembly 104. The rear brake caliper 126 is configured to apply a braking force to the second wheel assembly 108. A front brake lever 142 is mounted to the handle bar 140. The front brake lever 142 is operatively connected to the front brake caliper 124. The user depresses the front brake lever 142 and in response the front brake caliper 124 applies the braking force to the first wheel assembly 106. A rear brake lever 144 is mounted to the handle bar 140. The rear brake lever 144 is operatively connected to the rear brake caliper 126. The user depresses the rear brake lever 144 and in response the rear brake caliper 126 applies the braking force to the second wheel assembly 108. According to an option, any one or both of the front brake lever 142 and the rear brake lever 144 are configured to send a control (command) signal to the controller assembly 132 for control of the electric hub motor 122 if so desired.

A saddle 146 (seat) is operatively mounted to the frame assembly 100. The saddle 146 is configured to support the weight of the user during operation of the vehicular system 10. According to an option, the saddle 146 may be wider so as to better support the rider for the case where the rider places more weight, in the sitting position, to the frame assembly 100.

A steering assembly 148 (a combination of headset, steering tube, etc.) is attached to the handle bar 140. The steering assembly 148 is configured to operatively couple the handle bar 140 to the frame assembly 100. The steering assembly 148 is configured to permit the user to rotate or to manipulate the handle bar 140 as may be required to steer or guide the vehicular system 10. The steering assembly 148 is positioned forward of the user's position.

The vehicular system 10 has an ergonomic aspect. The vehicular system 10 has pedals cooperatively coupled to the first wheel assembly 106, and the first wheel assembly 106 is larger than the second wheel assembly 108. The riding position is taken back by an amount such that the user is positioned in a heads-up position looking forward to the road ahead (as depicted in FIG. 2B). By dropping the user back and rotating the user on an axis point helps to lower the center of gravity of the user, thus making the vehicular system 10 easier to use, and in addition helps to support the user for the case where the user stops the movement of the vehicular system 10 by lowering his feet to make contact with the ground. The first crank arm 110 and the second crank arm 114 of the vehicular system 10 are placed forward of the user instead of directly underneath the user.

In summary, the frame assembly 100 is configured to operatively support the user. The first wheel assembly 106 is configured to rotatably couple to the frame assembly 100. The user-interface assembly 119 is configured to chainlessly couple to the first wheel assembly 106. The second wheel assembly 108 is configured to rotatably couple to the frame assembly 100. The externally-powered assembly 121 is operatively coupled to the second wheel assembly 108. The externally-powered assembly 121 is configured to provide external power, at least in part, to the second wheel assembly 108. The term "chainless" means without having a chain of serially-connected pivoting links. Typically, a chain transmits power from the pedals to the driving wheel of a bicycle. The chain includes a series of (usually metal) rings or links fitted into one another to make a flexible ligament.

Figure 2A:
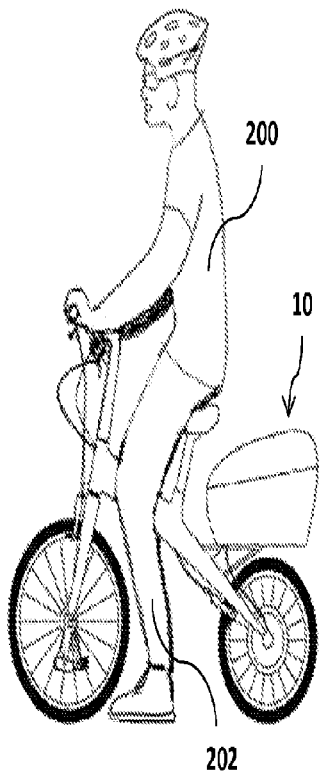
FIGS. 2A, 2B, 2C depict examples of side elevation views of the vehicular system of FIG. 1, in which a user is supportably received by the vehicular system of FIG. 1.
Figure 2B:
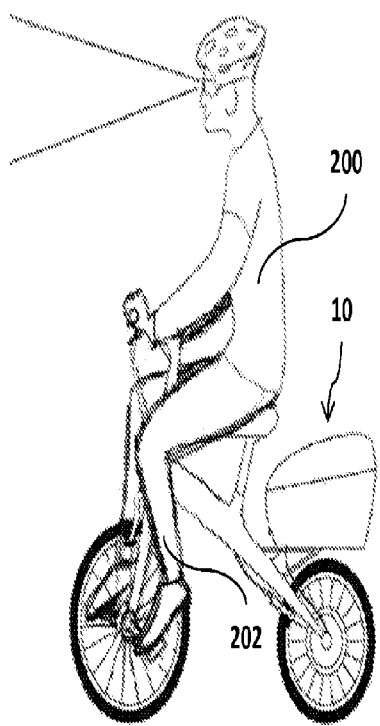
Figure 2C:
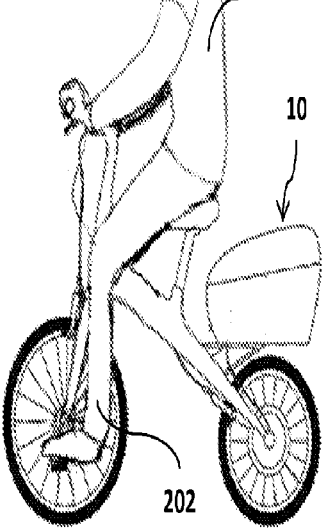

FIGS. 2A, 2B, 2C depict examples of side elevation views of the vehicular system 10 of FIG. 1 in which a user is supportably received by the vehicular system 10 of FIG. 1.

With reference to FIG. 2A, the user 200 is received and supported by the vehicular system 10, in which the user 200 is the rest position where the user's feet make contact the ground while the user 200 remains seated or in contact with the seat of the vehicular system 10 so that the user's weight is distributed over: (i) the seat supported by the frame assembly 100, and (ii) the feet contacting the ground.

With reference to FIG. 2B, during a first operation mode (the pedaling mode or a limb-operating mode), energy is generated by alternating movement of user limbs 202 of the user 200 between a protracted-limb position and a retracted-limb position. In the first operating mode, the user 200 is in the pedaling position, in which the user provides, at least in part, energy to the vehicular system 10 so as to cause the vehicular system 10 to move. The pedals of the vehicular system 10 are depicted in the offset position for the first operation mode.

With reference to FIG. 2C, during the second operation mode (a cruising mode or a side-by-side limb cruising mode), side-by-side positioning of user limbs 202 of the user 200 includes maintaining user limbs 202 of the user 200 in a protracted-limb position as depicted. The second operation mode includes the user 200 in the cruising position, in which the feet of the user 200 are positioned parallel (side-by-side) and in a comfortable, balanced position for the case where the vehicular system 10 moves forwardly. Sometimes for the penny farthing type bicycle (known and not depicted), in which a front wheel is sized larger in diameter relative to the diameter of a rear wheel, it may appear to the user that there is an interaction between feet and hands that may feel unnatural to the user. In sharp contrast, the cruising position as depicted in FIG. 2C helps to advantageously neutralize this unnatural feeling or sensation. The pedaling position may cause forces that may seem counteractive to the hands of the user while the user steers the vehicular system 10. The cruising mode mitigates (reduces), at least in part, the unnatural feel sensed by the user.

Figure 3A:
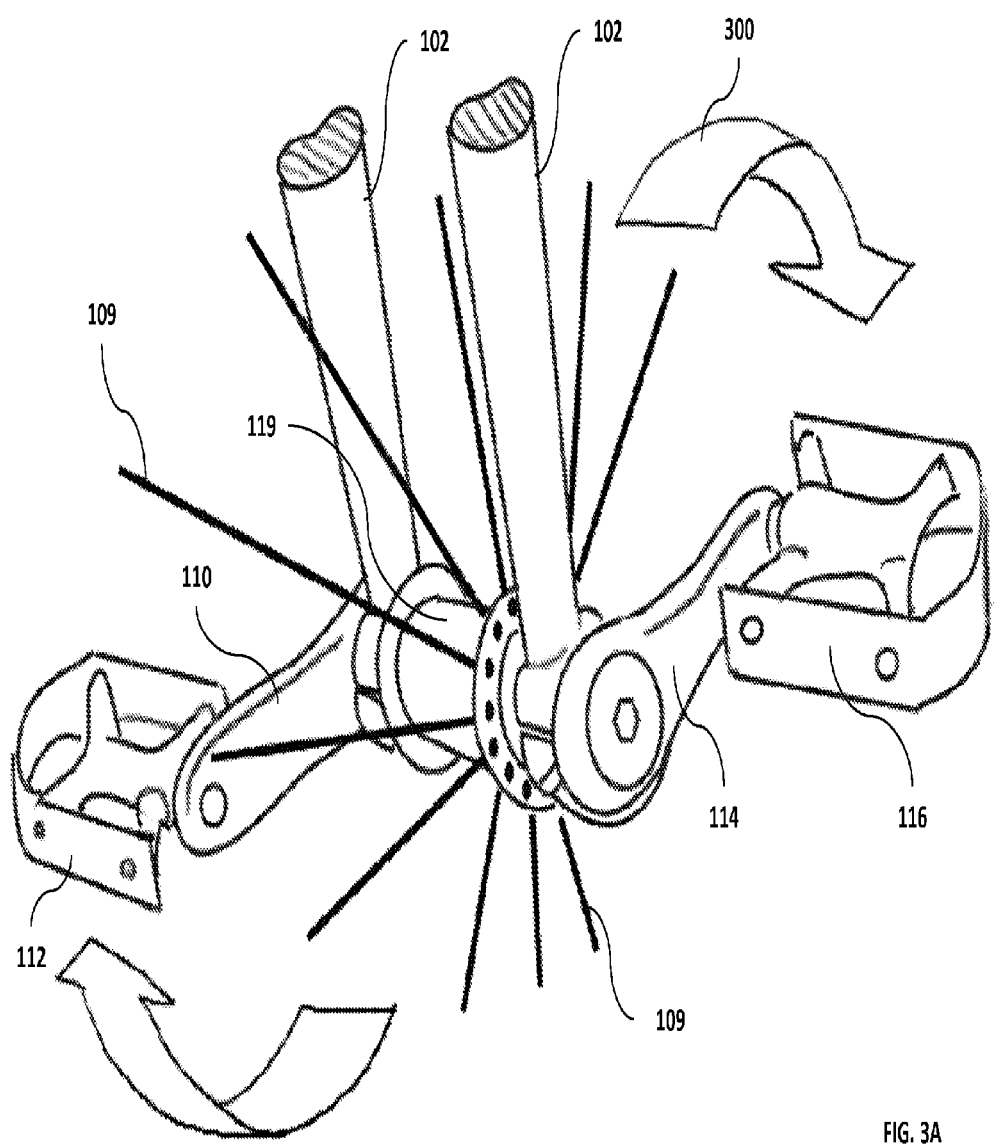
FIGS. 3A and 3B depict examples of perspective views of a user-interface assembly 119 configured for connection with the vehicular system of FIG. 1.
Figure 3B:
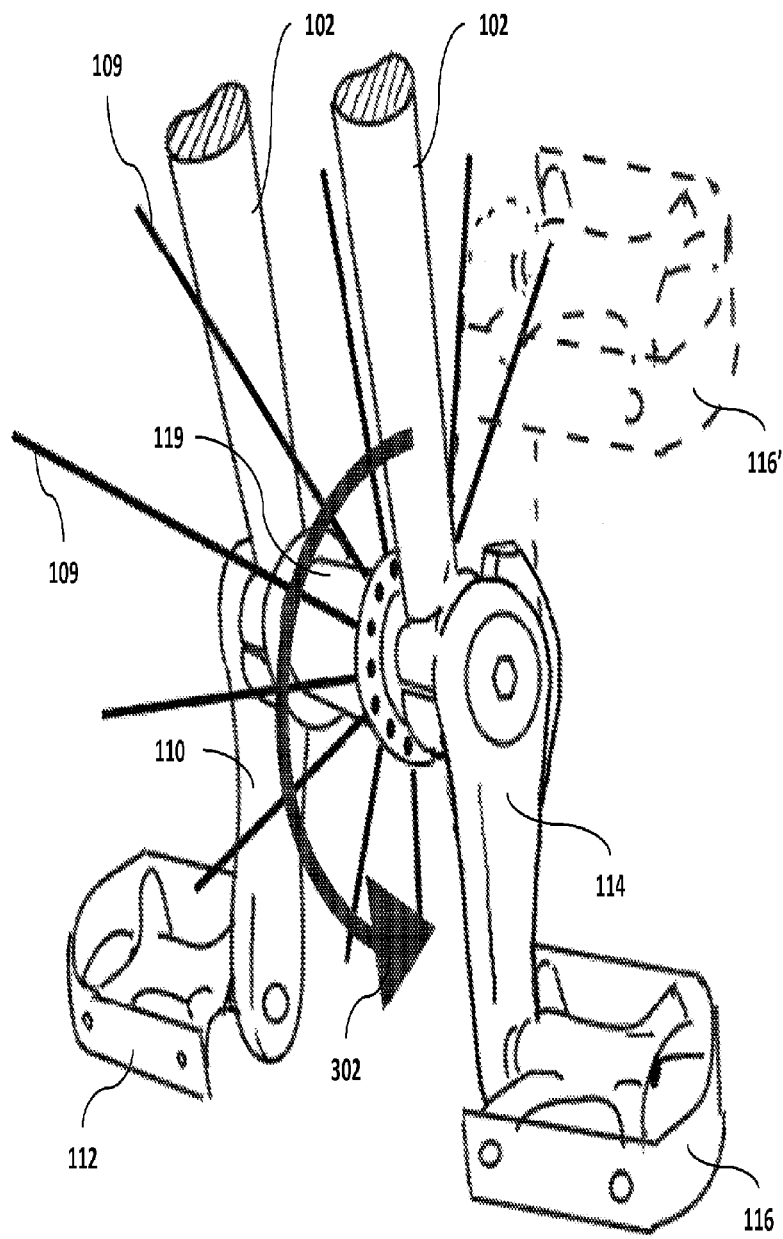

FIGS. 3A and 3B depict the examples of the perspective views of the user-interface assembly 119 configured for connection with the vehicular system 10 of FIG. 1.

Referring now to FIG. 3A, the pedaling position (or pedaling mode) is depicted, in which the first pedal 112 and the second pedal 116 are positioned or placed in an offset position 180 degrees apart relative to each other. As well, the first crank arm 110 and the second crank arm 114 are positioned or placed in an offset position 180 degrees apart relative to each other. As the user alternatingly applies force to the first pedal 112 and to the second pedal 116, the first crank arm 110 and the second crank arm 114 rotate along the rotation direction 300 while the first crank arm 110 and the second crank arm 114 remain in a locked condition or position relative to each other at they rotate. The user-interface assembly 119 is depicted as being fixedly connected to the end portion of the first fork assemblies 102 of the frame assembly 100, while permitting the first crank arm 110 and the second crank arm 114 to rotate about a rotation axis that extends longitudinally through the user-interface assembly 119. An example of the user-interface assembly 119 is depicted in FIG. 5.

Referring now to FIG. 3B, the cruising position (or cruising mode or side-by-side mode) is depicted. In order to realize the cruising position, the user places a de-coupling force or de-latching force to the second pedal 116' (shown in dashed lines) while maintaining the first pedal 112 is a relatively stationary position. The de-latching force is configured to cause or is large enough to cause the second pedal 116' to become dislodged from the pedaling position, and then the second pedal 116' is free to float or to freely rotate toward the cruising position along the rotation direction 302. The cruising position is such that the second pedal 116 is positioned side-by-side relative to the first pedal 112, or is such that the second crank arm 114 is positioned side-by-side relative to the second crank arm 114.

Figure 4A:
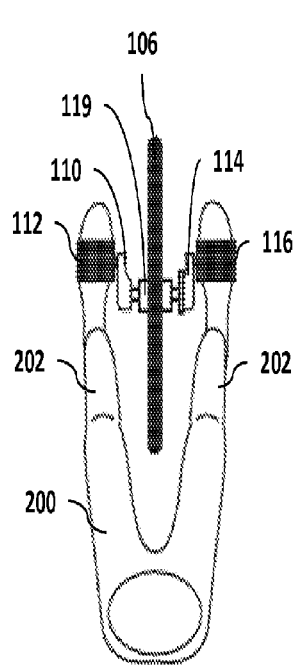
FIGS. 4A, 4B, 4C depict examples of partial top views of a front section of the vehicular system of FIG. 1.
Figure 4B:
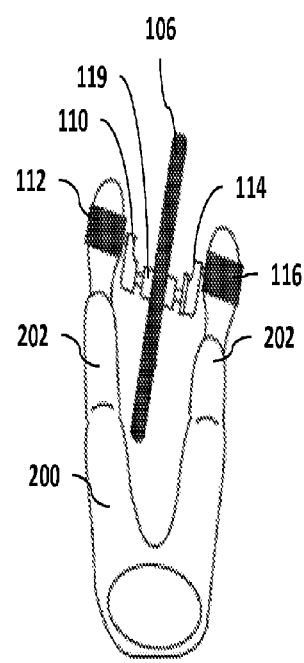
Figure 4C:
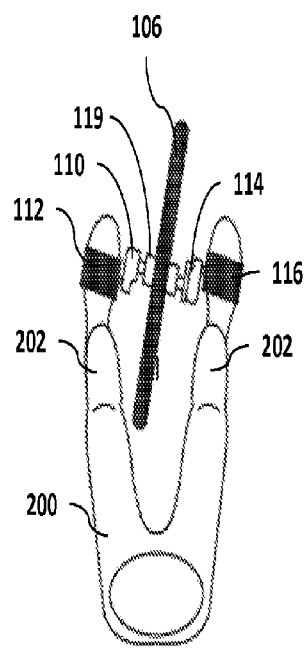

FIGS. 4A, 4B, 4C depict the examples of the partial top views of the front section of the vehicular system 10 of FIG. 1.

Referring now to FIG. 4A, the cruising position is depicted for the case in which the first wheel assembly 106 is steered forward along a straight line; that is, the first wheel assembly 106 rotates on the ground forwardly along a straight line of travel. The first pedal 112 and the second pedal 116 are depicted in the side-by-side condition or position. As well, the first crank arm 110 and the second crank arm 114 are depicted in the side-by-side position or condition. The orientation of the user limbs 202 (such as the legs and feet) are side-by-side (parallel) as well for this case.

Referring now to FIG. 4B, the cruising position is depicted for the case in which the first wheel assembly 106 is steered such that the first wheel assembly 106 causes the vehicular system 10 to take a direction turning toward one side (such as the right side as depicted or to the left side). According to the option depicted in FIG. 4B, the first crank arm 110 and the second crank arm 114 remain in the side-by-side condition or position, while the first wheel assembly 106 is made to steer the vehicular system 10 to the right by the user 200, and for this case the user limbs 202 do not remain in the side-by-side condition or position, but rather the user limbs 202 are positioned such that one limb is positioned slightly ahead of another limb (one limb slightly ahead of another limb). For this case, the first pedal 112 and the second pedal 116 remain side-by-side during the turning movement of the first wheel assembly 106.

Referring now to FIG. 4C, the cruising position is depicted for the case in which the first wheel assembly 106 is steered such that the first wheel assembly 106 causes the vehicular system 10 to take a direction turning toward one side (such as the right side as depicted or the left side). According to the option depicted in FIG. 4C, the first crank arm 110 and the second crank arm 114 do not remain in the side-by-side condition or position, and the first pedal 112 and the second pedal 116 do not remain in the side-by-side condition (substantially side-by-side). For this case however, the user limbs 202 remain in the side-by-side position or condition while the first wheel assembly 106 causes the vehicular system 10 to turn (to the right or to the left). Advantageously, for this case, the first pedal 112 and the second pedal 116 are free to float (to position by themselves), which compensates for the odd sensation of steering cause by the first wheel assembly 106 turning to the left side or to turning to the right side. For this case depicted in FIG. 4C, the floating condition (position) of the first crank arm 110 and the second crank arm 114 results in a more consistent length of the user limbs 202 (leg length) that may be maintained despite the steering assembly 148 (of FIG. 1) turning the first wheel assembly 106 (turning left or turning right). This arrangement (of FIG. 4C) compensates for the potentially odd or peculiar sensation that may be felt or experienced by the user 200 while the first wheel assembly 106 turns for the case where both hands and feet feel coupled in the turning process (as depicted in FIG. 4B). The sensation (felt by the user in FIG. 4C) is unlike a conventional bicycle in which the steering forces on the hands are independent of the feet. For this case, the first crank arm 110 and the second crank arm 114 become rotated slightly offset from each other in order to keep the user limbs 202 of the user in the side-by-side relationship.

FIG. 5 depicts the example of the exploded view of the user-interface assembly 119 of FIGS. 3A and 3B. The following is a detailed and specific description of the user-interface assembly 119. The first crank arm 110 defines or provides a first pedal interface 111 (such as threads for example) configured to interface with a pedal assembly (not depicted). The first crank arm 110 provides a crank interface 502 configured to interface with a rotatable shaft assembly 518 at a shaft interface 504 of the rotatable shaft assembly 518. The second crank arm 114 defines or provides a second pedal interface 115 configured to interface with another pedal assembly (not depicted). A crank passageway 117 is defined by the second crank arm 114, and the crank passageway 117 is configured to be rotatably connected to a crank-arm interface 530. The crank-arm interface 530 is slidably and pivotally received in the crank passageway 117. A frame-interface assembly 520 is configured to slidably receive the rotatable shaft assembly 518, and the frame-interface assembly 520 is positioned adjacent or near to the first crank arm 110. The hub-clutch assembly 512 is configured to slidably receive the rotatable shaft assembly 518, and the hub-clutch assembly 512 is positioned adjacent to or proximate to the frame-interface assembly 520. Another frame-interface assembly 520 is then positioned adjacent to the hub-clutch assembly 512. The rotatable shaft assembly 518 provides a shaft interface 524 at one end of the rotatable shaft assembly 518. The shaft interface 524 of the rotatable shaft assembly 518 then fixedly receives the body assembly 538. The body assembly 538 is connected to the end of the rotatable shaft assembly 518. The crank-arm interface 530 is then slidably received in the crank passageway 117. The end cap 542 is inserted into the crank passageway 117 of the second crank arm 114. The internal threads 536 of the crank-arm interface 530 connect (threadably couple) with the end cap 542. The internal threads 536 are defined or provided by the crank-arm interface 530. The internal threads 536 are configured to interface (connect) with the end cap 542. The end cap 542 defines a tool interface 544, which may be a hex-shaped hole configured to interface with a hex head tool.

The frame-interface assembly 520 is configured to interface to the frame assembly 100 of FIG. 1. For the case where more than one of the first fork assemblies 102 extend from the frame assembly 100 (as depicted in FIGS. 3A, 3B), a first frame-interface assembly 520 and a second frame-interface assembly 520 are positioned on opposite sides of the hub-clutch assembly 512. The frame-interface assembly 520 includes (by way of example) a sealed bearing case configured to be received by or to be connected to the first fork assembly 102 of FIGS. 3A and 3B.

A first flange 508 radially extends from an end portion of the hub-clutch assembly 512. The first flange 508 defines spoke holes 510 configured to interface with spoke members 109 of the first wheel assembly 106 of FIG. 1. A second flange 516 radially extends from the opposite end portion of the hub-clutch assembly 512. The second flange 516 defines spoke holes 514 configured to interface with spoke members 109 of the first wheel assembly 106 of FIG. 1.

A detent mechanism 526 is positioned proximate to a first stop 528. The first stop 528 radially extends from the body assembly 538. A second stop 532 radially extends from the body assembly 538. The first stop 528 and the second stop 532 are located or positioned at opposite sides of the body assembly 538. A pin assembly 540 extends laterally from the second crank arm 114 towards the hub-clutch assembly 512. The pin assembly 540 interacts with the first stop 528 and with the second stop 532. A guiding surface 534 is provided by the body assembly 538. The pin assembly 540 moves along or is guided by the guiding surface 534 as the pin assembly 540 moves between the first stop 528 and the second stop 532 in response to the second crank arm 114 being moved while the first crank arm 110 remains stationary. The detent mechanism 526 may include, by way of example, a spring clip assembly that is configured to hold the pin assembly 540 against the first stop 528 located or positioned on the body assembly 538. The first stop 528 is used for enable the pedaling mode or position depicted in FIG. 3A. The second stop 532 is used to enable the cruising mode or position as depicted in FIG. 3B.

For example, the crank-arm interface 530 may include a sleeve member (for example) as depicted in FIG. 5 for the sake of simplification of manufacturing the user-interface assembly 119. Other forms may be used for the crank-arm interface 530. The crank-arm interface 530 provides a guiding surface 534 configured to guide the pin assembly 540 between the first stop 528 and the second stop 532. As depicted in FIG. 5, the first stop 528 and the second stop 532 extend from a body assembly 538, and the pin assembly 540 extends from the second crank arm 114. It will be appreciated that in accordance with a variation, the opposite arrangement (not depicted) may be made in which the first stop 528 and the second stop 532 extend from the second crank arm 114 toward the pin assembly 540, and the pin assembly 540 extends from the body assembly 538.

More specifically, the rotatable shaft assembly 518 extends laterally (longitudinally) and has, for example, a shaft interface 504 (for example, a square-shaped taper) and a shaft interface 524 (for example, a square-shaped taper) configured to connect with the first crank arm 110 and the second crank arm 114, respectively. The first crank arm 110 is in fixed position connected to rotatable shaft assembly 518 (axle). The second crank arm 114 is pivotally (rotatable) mounted to the rotatable shaft assembly 518 via the body assembly 538. The second crank arm 114 slides over the crank-arm interface 530. The body assembly 538 provides the first stop 528 and the second stop 532 that are located approximately on opposite sides of the body assembly 538. The pin assembly 540 is mounted to one side of the second crank arm 114 facing the first stop 528 and the second stop 532. The pin assembly 540 is configured to stop against (or abut) the first stop 528 and the second stop 532. The first stop 528 has a detent mechanism 526 configured to maintain position of the second crank arm 114 until the user has decided to unlock and swing the second crank arm 114 toward the second stop 532. According to an option, the second stop 532 does not include a spring clip assembly that is configured to forces the second crank arm 114 to be locked once the pin contacts the second stop 532. As depicted in FIG. 5, the second crank arm 114 is not locked into position against the second stop 532. It will be appreciated that in accordance with an option, the detent mechanism 526 may be placed or positioned proximate to the second stop 532 if so desired.

According to a variation (not depicted), the first crank arm 110 and the second crank arm 114 may be set or used as independently floatable relative to each other. According to the variation as depicted in FIG. 5, one of the crank arms is locked in position while the other crank arm may float. However, according to another variation (not depicted), each crank arm is floating; that is, each crank arm has separate spring clips, stops, etc. If the consideration is to save weight and complexity, then the first variation (as depicted in FIG. 5) may be selected so that one crank arm remains in a locked position (relatively speaking) while the other crank arm floats relative to the locked crank arm.

The following provides a generic (general) description of the user-interface assembly 119. Generally speaking, in accordance with the example depicted in FIG. 5, the vehicular system 10 includes (and is not limited to): (i) a frame-interface assembly 520, and (ii) a user-interface assembly 119. The user-interface assembly 119 is coupled to the frame-interface assembly 520. The user-interface assembly 119 is configured to selectively permit the user to operate the vehicular system 10 between a limb-operating mode and a side-by-side limb cruising mode. It is left to the judgment of the user to select a desired one of a limb-operating mode and a side-by-side limb cruising mode to operate the vehicular system 10.

More specifically (in accordance with FIG. 5), the user-interface assembly 119 includes (and is not limited to): (i) the first crank arm 110, (ii) the second crank arm 114, (iii) a first interface mechanism 590 configured to fixedly connect to the second crank arm 114, and (iv) a second interface mechanism 592. The second interface mechanism 592 is configured to: (a) fixedly connect to the first interface mechanism 590, (b) rotatably couple with the second crank arm 114, and (c) permit rotation of the second crank arm 114 relative to the first crank arm 110 between a first operating mode and a second operating mode. The first operating mode (otherwise may be called the limb-operating mode or pedaling mode) is depicted in FIG. 3A. The second operating mode (otherwise may be called the side-by-side limb cruising mode or cruising mode) is depicted in FIG. 3B.

By way of example, the first interface mechanism 590 includes (and is not limited to): a rotatable shaft assembly 518 configured to fixedly couple to the first crank arm 110. More specifically, the rotatable shaft assembly 518 includes a shaft interface 504, and FIG. 5 depicts the shaft interface 504 as being square shaped.

By way of example, the second interface mechanism 592 includes (and is not limited to): (i) a body assembly 538, and (ii) a crank-arm interface 530. The body assembly 538 is fixedly coupled to the rotatable shaft assembly 518. The crank-arm interface 530 extends from the body assembly 538 (toward the second crank arm 114). The crank-arm interface 530 is coaxially aligned with a longitudinal axis extending through the rotatable shaft assembly 518. The crank-arm interface 530 is configured to rotatably couple with the second crank arm 114. More specifically, the crank-arm interface 530 is configured to be rotatably received in a crank passageway 117 defined by the second crank arm 114.

More specifically, the second interface mechanism 592 further includes (and is not limited to): (i) a first stop 528, and (ii) a second stop 532. The first stop 528 radially extends from the body assembly 538. The second stop 532 radially extends from the body assembly 538. The second stop 532 is rotatably offset from the first stop 528. As depicted, the approximate offset is 180 degrees apart. The first stop 528 and the second stop 532 are configured to permit rotation of the second crank arm 114 relative to the first crank arm 110 between the first operating mode and the second operating mode. As well, the second interface mechanism 592 further includes (and is not limited to): (i) a pin assembly 540, and (ii) a detent mechanism 526. The detent mechanism 526 is configured to lock movement of one part of a mechanism, and/or a locking piece of a mechanism, which may be spring-loaded to check the movement of a mechanism in a direction. The pin assembly 540 extends from the second crank arm 114 toward the body assembly 538. The detent mechanism 526 is associated with (positioned proximate to) the first stop 528. The detent mechanism 526 is configured to apply a locking force configured to lockably couple the second crank arm 114 for a case where the pin assembly 540 is rotated toward and abuts with the first stop 528 so that the second crank arm 114 is positioned in the first operating mode. As well, the detent mechanism 526 is configured to permit rotation of the second crank arm 114 away from the first stop 528 for the case where the second crank arm 114 is rotated away from the first stop 528 toward the second stop 532 with a rotation force being larger than the locking force, so that the second crank arm 114 may be positioned in the second operating mode. The locking force may be overcome to thus unlock the second crank arm 114.

It will be appreciated that the first interface mechanism 590 further includes (and is not limited to) the frame-interface assembly 520 configured to fixedly receive the rotatable shaft assembly 518. The frame-interface assembly 520 includes, for example and not limited thereto, a sealed bearing case configured to connect to the frame assembly 100, such as to the first fork assembly 102 of the frame assembly 100 of FIG. 1.

As well, the first interface mechanism 590 further includes (and is not limited to): a freewheeling hub with an internal clutch, which is hereafter referred to as the hub-clutch assembly 512. The hub-clutch assembly 512 is configured to fixedly receive the rotatable shaft assembly 518. The hub-clutch assembly 512 is a known assembly manufactured, by way of example, by the Huffy Bicycle Company located in the state of Ohio in the United States of America. The hub-clutch assembly 512 includes a known clutch mechanism, and an example of which is manufactured and installed on the Huffy Green Machine model number: 98148A. The hub-clutch assembly 512 may include or has an internal clutch mechanism similar to a bicycle freewheel mechanism (known). In effect, the hub-clutch assembly 512 is configured to permit the first wheel assembly 106 to float on the rotatable shaft assembly 518 that is supported by the frame-interface assembly 520. The frame-interface assembly 520, by way of example, includes outboard sealed bearings configured to allow the user to pedal the first wheel assembly 106 (of FIG. 1) on the first fork assembly 102 while allowing first wheel assembly 106 to coast independently when needed or required by the user, and so the first wheel assembly 106 may rotate while the feet of the user remain at rest (as depicted in FIG. 3B). The hub-clutch assembly 512 may be installed in the hub of the first wheel assembly 106. In summary, the user-interface assembly 119 is configured to permit pedaling of the first wheel assembly 106 in the pedaling operation mode (as depicted in FIG. 3A), and the user-interface assembly 119 is also configured to permit coasting (cruising) without moving the pedal (that is, not moving the limbs) in the cruising mode (as depicted in FIG. 3B).

Generally speaking, it will be appreciated that the frame-interface assembly 520 may be configured to interface with any one of a bicycle, an electric bicycle, a motorized bicycle, a tricycle, a unicycle, a quadracycle, a tandem bicycle, and a sociable bicycle. In addition, the frame-interface assembly 520 may be configured to interface with any one of a car, a motorcycle, a train, a ship, a boat, an aircraft, watercraft, sailcraft, aircraft, hovercraft and spacecraft.

FIGS. 6A, 6B, 6C depict the examples of the partial side views of the user-interface assembly 119 of FIGS. 3A and 3B.

Referring now to FIG. 6A, the second crank arm 114 and the first crank arm 110 are positioned in the pedaling operation mode for the case where the first crank arm 110 and the second crank arm 114 remain in opposite orientation or condition when the first wheel assembly 106 of FIG. 4A is made to rotate in a forwardly direction as the vehicular system 10 moves along a straight line.

Referring now to FIG. 6B, the second crank arm 114 and the first crank arm 110 are positioned in the cruising operation mode for the case where the second crank arm 114 and the first crank arm 110 remain in a side-by-side orientation or condition when the first wheel assembly 106 of FIG. 4B is made to turn to the right (or turned to the left). For this case, the limbs of the user do not remain in a side-by-side condition as the first wheel assembly 106 rotates to turn the vehicular system 10.

Referring now to FIG. 6C, the second crank arm 114 and the first crank arm 110 are positioned in the cruising operation mode for the case where the second crank arm 114 and the first crank arm 110 do not remain in a side-by-side orientation or condition when the first wheel assembly 106 of FIG. 4C is made to turn to the right (or turned to the left). For this case, the limbs of the user remain in a side-by-side condition as the first wheel assembly 106 rotates to turn the vehicular system 10. For this case, the first crank arm 110 and the second crank arm 114 are offset aligned from each other as the first wheel assembly 106 rotates to turn the vehicular system 10.

It will be appreciated that for the purposes of this document, the phrase "includes (but is not limited to)" is equivalent to the word "comprising." The word "comprising" is a transitional phrase or word that links the preamble of a patent claims to the specific elements set forth in the claims that define what the invention itself actually is. The transitional phrase acts as a limitation on the claim, indicating whether a similar device, method, or composition infringes the patent if the accused device (etc.) contains more or fewer elements than the claim in the patent. The word "comprising" is to be treated as an open transition, which is the broadest form of transition, as it does not limit the preamble to whatever elements are identified in the claim. As well, "an assembly" is functionally equivalent to "at least one assembly". "An assembly" is not limited to one and only one assembly. It is understood that "an assembly" and "at least one assembly" means that there is one or more instances of the assembly. It is understood that "an assembly, system, component, or entity, etc." is functionally equivalent to "at least one or more assemblies, systems, components, or entities".

It may be appreciated that the assemblies and modules described above may be connected with each other as may be required to perform desired functions and tasks that are within the scope of persons of skill in the art to make such combinations and permutations without having to describe each and every one of them in explicit terms. There is no particular assembly, components, or software code that is superior to any of the equivalents available to the art. There is no particular mode of practicing the disclosed subject matter that is superior to others, so long as the functions may be performed. It is believed that all the crucial aspects of the disclosed subject matter have been provided in this document. It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) description provided outside of this document (that is, outside of the instant application was filed, as prosecuted, and/or as granted). It is understood, for the purposes of this document, the phrase "includes (and is not limited to)" is equivalent to the word "comprising." It is noted that the foregoing has outlined the non-limiting embodiments (examples). The description is made for particular non-limiting embodiments (examples). It is understood that the non-limiting embodiments are merely illustrative as examples.

What is claimed is:

1. A vehicular system for a user, the vehicular system comprising:
   a frame assembly;
   a first fork assembly extending forwardly and downwardly from the frame assembly;
   a steering assembly extending from the first fork assembly;
   a front wheel assembly being rotatably mounted to the first fork assembly;
   a second fork assembly extending downwardly and rearward from the frame assembly;
   a rear wheel assembly being rotatably mounted to the second fork assembly;
   a user-interface assembly being configured to selectively permit the user to operate the vehicular system between a limb-operating mode and a side-by-side limb cruising mode, and
   the user-interface assembly including: a rotatable shaft assembly having a first shaft interface and a second shaft interface positioned at opposite ends of the rotatable shaft assembly;
   a hub-clutch assembly being mounted to the rotatable shaft assembly;
   a first frame-interface assembly and a second frame-interface assembly being mounted to the rotatable shaft assembly, and being positioned on opposite sides of the hub-clutch assembly, and the first frame-interface assembly and the second frame-interface assembly being connected to the first fork assembly;
   a first flange and a second flange each radially extending from the hub-clutch assembly, and each being positioned on opposite sides of the hub-clutch assembly, and the first flange and the second flange each being connected to the front wheel assembly;
   a first pedal;
   a first crank arm being fixedly connected to the first pedal, and the first crank arm being fixedly connected to the first shaft interface of the rotatable shaft assembly;
   a second pedal; and
   a second crank arm being connected to the second pedal, and the second crank arm having a pin assembly extending laterally towards the hub-clutch assembly; and wherein in the side-by-side limb cruising mode, the first crank arm and the second crank arm are free to float and position by themselves while the front wheel assembly is steered to cause the vehicular system to turn toward one side in such a way that provide the first pedal and the second pedal to be positioned slightly offset from each other, wherein in the side-by-side limb cruising mode an unnatural sensation experienced by the user becomes neutralized, at least in part while:
   (A) the user maintains hands of the user being coupled to the steering assembly and also maintains feet of the user being coupled to the first pedal and the second pedal;
   (B) the steering assembly turns the front wheel assembly toward one side;
   (C) the first crank arm and the second crank arm freely float and position themselves; and
   (D) the first pedal and the second pedal float between a side-by-side orientation to a position where the first pedal and second pedal are positioned slightly offset from each other.

2. The vehicular system of claim 1, wherein:
   the frame assembly is configured to operatively support the user; and
   the user-interface assembly is configured to chainlessly couple to the front wheel assembly.

3. The vehicular system of claim 2, further comprising:
   an externally-powered assembly being operatively coupled to the rear wheel assembly, and the externally-powered assembly being configured to provide external power, at least in part, to the rear wheel assembly.

4. The vehicular system of claim 1, wherein: during the side-by-side limb cruising mode, a side-by-side positioning of the feet of the user includes maintaining the feet of the user in a protracted-limb position.

5. The vehicular system of claim 1, wherein: during the limb-operating mode, energy is generated by alternating movement of the feet of the user between a protracted-limb position and a retracted-limb position.

6. The vehicular system of claim 1, further comprising:
   a body assembly being fixedly connected to the second shaft interface of the rotatable shaft assembly, and having a crank-arm interface being rotatably coupled with the second crank arm, and the crank-arm interface extending from the body assembly toward the second crank arm, and the crank-arm interface being coaxially aligned with a longitudinal axis extending through the rotatable shaft assembly, and the body assembly including:
   a first stop radially extending from the body assembly; and
   a second stop radially extending from the body assembly, the second stop being spaced apart from the first stop, and the first stop and the second stop being interactable with the pin assembly of the second crank arm.

7. The vehicular system of claim 6, wherein: during the limb-operating mode, the second crank arm is rotatable in such a way that the pin assembly of the second crank arm is held against the first stop of the body assembly, and
   the user-interface assembly transfers, at least in part, energy being generated by movement of the feet of the user to the front wheel assembly, and the front wheel assembly rotates in response to receiving the energy; and
   during the side-by-side limb cruising mode, the second crank arm is rotatably movable between the first stop of the body assembly and the second stop of the body assembly, and the user-interface assembly maintains, at least in part, side-by-side positioning of the feet of the user for a case where the front wheel assembly rotates without receiving the energy generated by movement of the feet of the user; and a range of pivoting motion of the second crank arm is limited by the second stop of the body assembly.

8. The vehicular system of claim 6, further comprising:
a detent mechanism being associated with the first stop, and the detent mechanism being configured to:
  apply a locking force configured to lockably couple the second crank arm for a case where the pin assembly is rotated toward and abuts with the first stop so that the second crank arm is positioned in the limb-operating mode; and
  permit rotation of the second crank arm away from the first stop for the case where the second crank arm is rotated away from the first stop toward the second stop, so that the second crank arm is positioned in the side-by-side limb cruising mode.

9. The vehicular system of claim 6, wherein:
the body assembly further includes:
  a guiding surface extending between the first stop and the second stop in such a way that the pin assembly is movably guided along the guiding surface as the pin assembly is moved between the first stop and the second stop in response to movement of the second crank arm while the first crank arm remains stationary; and
  a detent mechanism being positioned proximate to the first stop;
  during the limb-operating mode, the second crank arm is rotated in such a way that the detent mechanism holds the pin assembly of the second crank arm against the first stop of the body assembly;
  during the side-by-side limb cruising mode, the user positions the first crank arm downwardly in such a way that the first crank arm is free to float;
  during the side-by-side limb cruising mode, the second crank arm is rotated downwardly in such a way that the pin assembly of the second crank arm is movable between the first stop of the body assembly and the second stop of the body assembly;
  a pivoting range of the second crank arm is limited by an angular motion of the second crank arm between the first stop and the second stop; and
  the second crank arm is free to float in the pivoting range.

10. The vehicular system of claim 1, wherein:
the second crank arm and the first crank arm are positioned in the limb-operating mode for a case where the first crank arm and the second crank arm remain in opposite orientation when the front wheel assembly is made to rotate in a forwardly direction as the vehicular system moves along a straight line.

11. The vehicular system of claim 1, wherein: during the side-by-side limb cruising mode, in a case in which the front wheel assembly is steered and the front wheel assembly causes the vehicular system to turn along a direction toward one side, the second crank arm and the first crank arm are positioned in the side-by-side limb cruising mode, such that the second crank arm and the first crank arm are capable of remaining in a side-by-side orientation when the front wheel assembly is made to turn, and the feet of the user do not remain in a side-by-side condition as the front wheel assembly rotates to turn steer the vehicular system.

12. The vehicular system of claim 1, wherein: during the limb-operating mode, the second crank arm and the first crank arm are positioned in the limb-operating mode, wherein the pedals are positioned 180 degrees apart relative to each other, such that the second crank arm and the first crank arm do not remain in a side-by-side orientation when the front wheel assembly is made to turn, and the feet of the user alternate between a protracted-limb position and a retracted-limb position as the front wheel assembly rotates to turn the vehicular system, and the first crank arm and the second crank arm remain in a locked position 180 degrees apart relative to each other as the front wheel assembly rotates to steer the vehicular system.

13. The vehicular system of claim 1, wherein during the side-by-side limb cruising mode, in a case in which the front wheel assembly is steered and the front wheel assembly causes the vehicular system to turn along a direction toward one side, the first crank arm and the second crank arm freely float so as to not remain in a side-by-side condition, and the first pedal and the second pedal do not remain in the side-by-side condition, and the first and second crank arms float independently to permit the feet of the user to remain in a side-by-side parallel position while the front wheel assembly steers the vehicular system to turn.

* * * * *